G. L. GRIMES.
MOLDING MACHINE.
APPLICATION FILED FEB. 4, 1910.

972,851.

Patented Oct. 18, 1910.
3 SHEETS—SHEET 1.

Witnesses
O. B. Baenziger,
Grace E. Wynkoop.

Inventor
George L. Grimes
By S. E. Thomas
Attorneys

THE NORRIS PETERS CO., WASHINGTON, D. C.

G. L. GRIMES.
MOLDING MACHINE.
APPLICATION FILED FEB. 4, 1910.
972,851.
Patented Oct. 18, 1910.
3 SHEETS—SHEET 2.
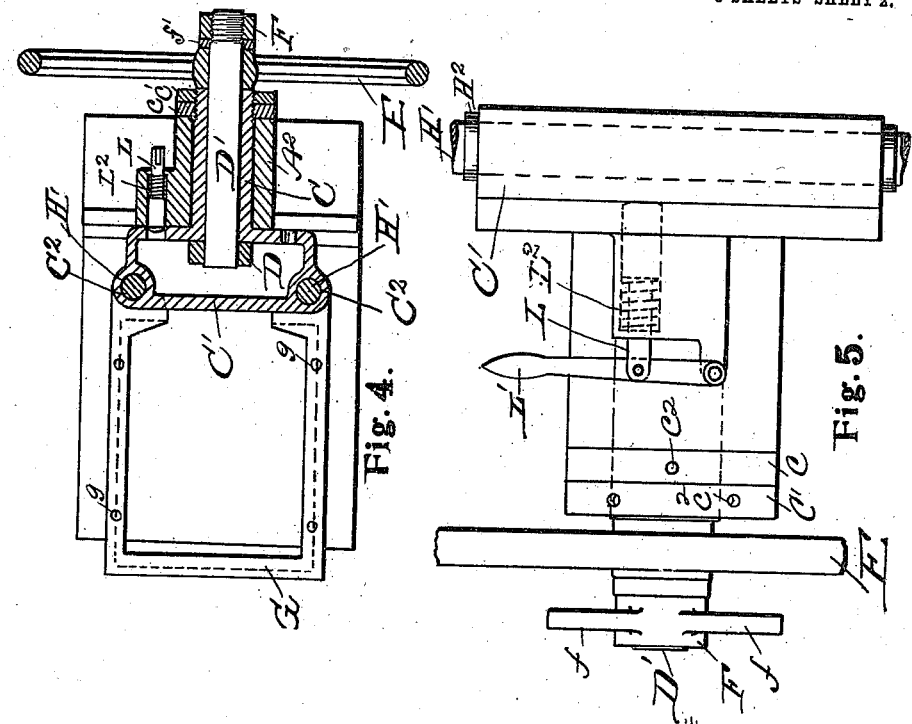
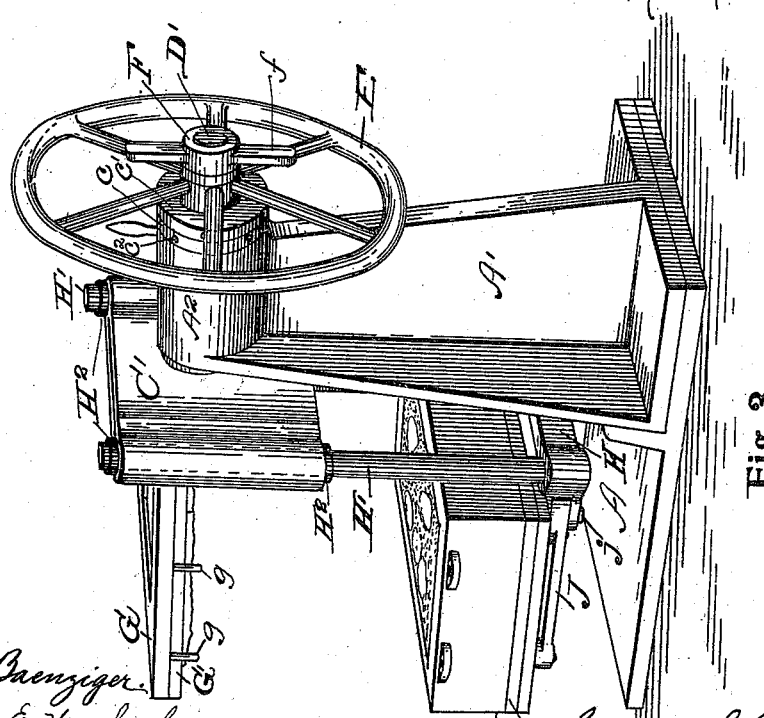
Witnesses
O. B. Baenziger.
Grace E. Wynkoop.
Inventor
George L. Grimes
By S. E. Thomas Attorneys G. L. GRIMES.
MOLDING MACHINE.
APPLICATION FILED FEB. 4, 1910.
972,851.
Patented Oct. 18, 1910.
3 SHEETS—SHEET 3.
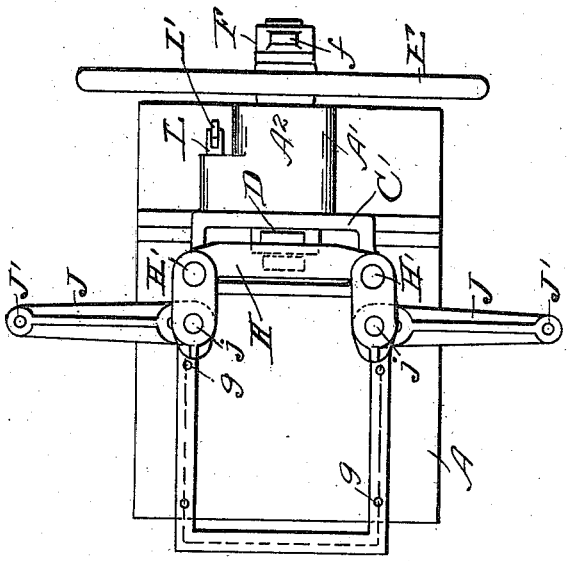
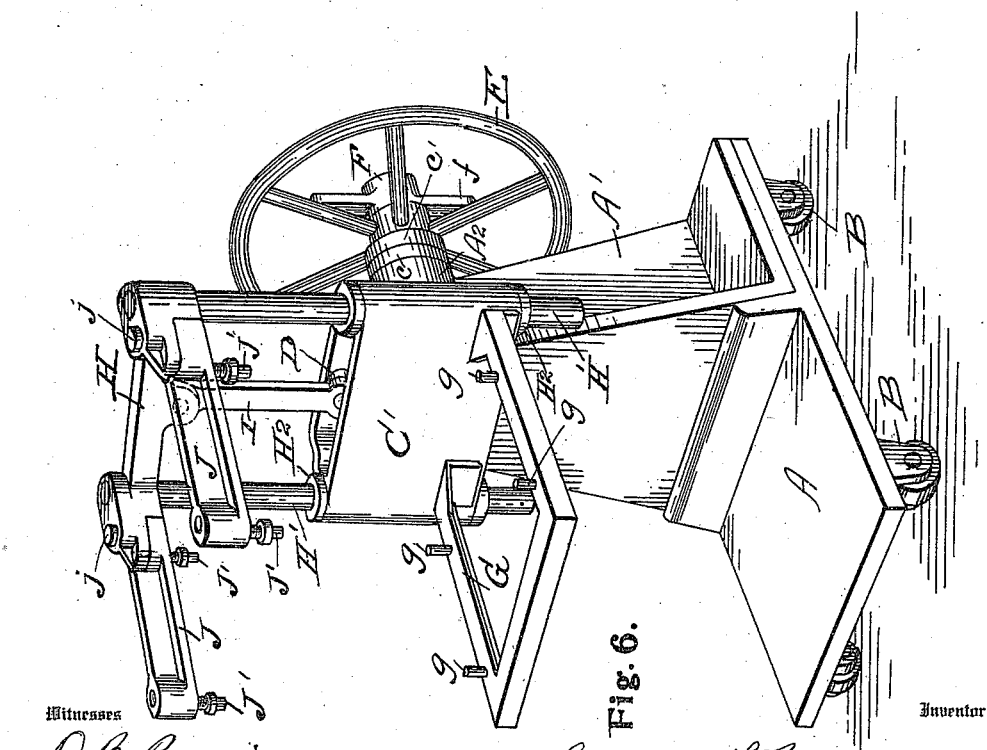

UNITED STATES PATENT OFFICE.

GEORGE L. GRIMES, OF DETROIT, MICHIGAN.

MOLDING-MACHINE.

972,851.  Specification of Letters Patent.  Patented Oct. 18, 1910.

Application filed February 4, 1910. Serial No. 541,984.

*To all whom it may concern:*

Be it known that I, GEORGE L. GRIMES, a citizen of the United States, residing at Detroit, county of Wayne, State of Michigan, have invented a certain new and useful Improvement in Molding-Machines, and declare the following to be a full, clear, and exact description of the same, such as will enable others skilled in the art to which it pertains to make and use the same, reference being had to the accompanying drawings, which form a part of this specification.

My invention relates to an improvement in molding machines, shown in the accompanying drawings and more particularly pointed out in the following specification and claims.

The object of my invention is an improvement in the general construction of the apparatus, means being provided for readily handling the flask during the operation of forming the mold.

One feature of the construction is the means employed for locking the rotatable frame in which the flask is supported while forming the mold and again upon withdrawing the mold from the pattern after reversing the latter.

Another feature of the construction provides means for supporting in an elevated position a pair of swinging arms while preparing the mold,—the arrangement being such that the same mechanism employed to raise or lower the arms with reference to the mold serves also to reverse the mold upon releasing the locking mechanism previously referred to.

Another feature is the means provided to admit of swinging the adjustable arms when raised to permit freedom of movement of the operator forming the molds.

Other advantages and improvements will hereafter appear.

Figure 2:
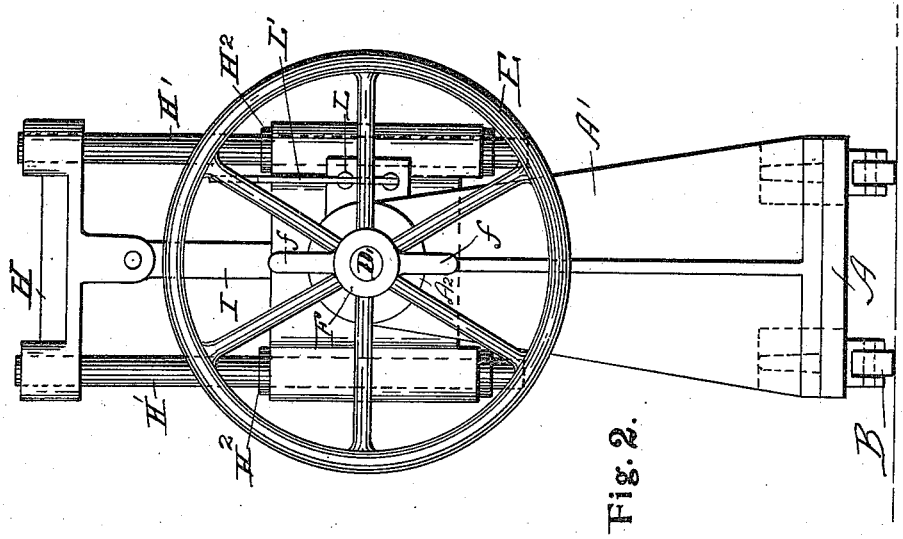
Figure 1:
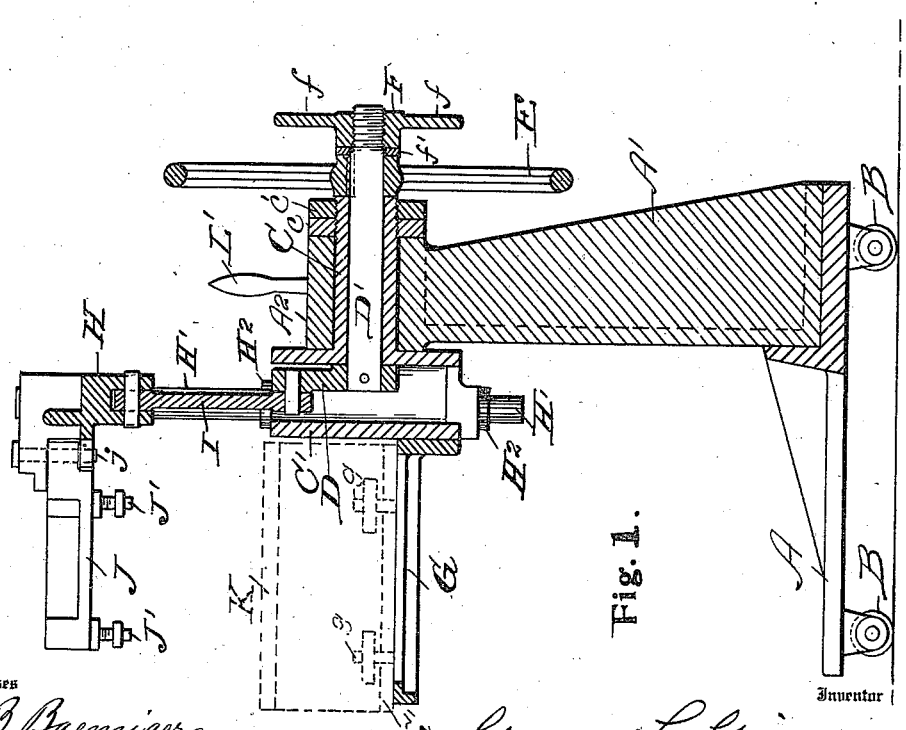

In the drawings:—Figure 1 is a central vertical section through the machine showing the flask in dotted lines,—the mold being ready to clamp the top board in position before reversing the flask. Fig. 2 is an end elevation of the machine in the position shown in Fig. 1,—looking toward the hand wheel employed to raise or lower the swinging arms and also to reverse the mold. Fig. 3 is a perspective view showing the mold reversed and removed from the pattern. Fig. 4 is a plan view with parts in section showing the manner of securing the flask when in its initial and in its reversed positions. Fig. 5 is a detail view of the locking mechanism shown in Fig. 4. Fig. 6 is a perspective view looking toward the front of the machine when in its initial position,—the flask being removed. Fig. 7 is a plan view showing the swinging arms turned to permit freedom of the operator in packing the sand in the mold.

Referring to the letters of reference placed upon the drawings:—A is a suitable base plate which may if desired be mounted upon wheels B for facility in moving the apparatus.

A' is a standard rising from the base plate provided at its top with a hub or bearing $A^2$ to receive the annular trunnion C having at one end a chambered casting C', substantially rectangular in form.

$C^2$ are longitudinal openings formed in the casting C' for the passage of the bars of an adjustable frame supported therein. The chambered casting C' is also formed with a relatively large central opening designed to admit of the rotation of a crank arm D mounted on the shaft D' in turn sleeved within the annular trunnion C.

c is a nut threaded on the annular trunnion C and bearing against the hub $A^2$ of the standard A' to secure the annular trunnion against lateral movement or end play.

c' is a locking nut to insure the nut c against displacement.

$c^2$ are radial holes formed in the edge of the nuts c and c' for the insertion of a suitable tool for purposes of adjustment.

E is a suitable hand operating wheel keyed to the shaft D'.

F is a nut screw-threaded upon the end of the shaft D' having projecting operating arms f for the purpose of adjusting it.

f' is a washer interposed between the nut and hub of the hand operating wheel.

G is a rectangular platform or frame bolted or otherwise secured to the chambered casting C' to which the pattern and follow-board G' is attached and upon which the flask rests when making up the mold.

g denotes upstanding pins rising from the rectangular platform or frame G and designed to enter perforated projecting ears formed in the walls of the flask to secure the latter against lateral displacement.

H is a movable cross-bar having projecting rods H' sleeved within suitable bushings H² in turn supported in the longitudinally openings C² of the chambered casting C'.

I is a pitman pivoted to the crank arm D and to the cross-bar H.

J are swinging arms pivoted at $j$ to the cross-bar H.

J' are adjustable bolts supported in the swinging arms, being designed to bear upon the board K covering the flask.

L is a spring actuated bolt supported in a projecting portion of the frame forming the standard A',—the end of the bolt being adapted to enter openings provided in the chambered casting C' to secure the latter against rotation in its initial and reversed positions.

L' is a lever, pivoted to the frame and to the bolt, by operating which the bolt may be withdrawn from locking engagement with the chambered casting C' against the action of the spring L².

Having indicated the several parts by reference letters, the operation of the machine will be readily understood.

The machine is first brought to the position indicated in Fig. 1 and the follow-board with its pattern secured thereto is then engaged to the platform G,—the flask being properly adjusted and held against displacement by the up-standing pins $g$ entering the perforations in the lugs of the flask. Sand is now packed around the pattern and when the mold is properly formed, the cover-board K is set in position and the frame lowered by first releasing the locking nut F and then rotating the frame by means of the hand wheel E until the bolts J' bear upon the board K. The bolts J' are then adjusted until the board is rigidly secured upon the top of the flask, the nut F is then tightened, when, upon a further rotation of the hand wheel E;—after first releasing the locking bolt L by the operation of its controlling lever L';—the flask may be brought to the reverse position indicated in Fig. 3 of the drawings. The locking mechanism L is now brought into action securing the annular trunnion supporting the flask against further rotation until again liberated. The nut F on the shaft D' is then released and the hand wheel E operated permitting the platform G carrying the flask to descend until it rests upon the base plate A. The pattern being attached to the follow-board G', in turn secured to the platform G, the act of lowering the flask serves to remove the pattern from the mold, as indicated in Fig. 3. Upon removing the flask the platform G may be returned to its initial position ready for the formation of a new mold.

It will be seen that the shaft D' is free to move laterally in order that it may be rotated when released by the adjustment of the nut F,—upon tightening which the hub of the crank arm D is drawn into frictional relation with the inner wall of the chambered casting C', thereby locking the shaft D' against rotation and thus securing the swinging arms J when in their elevated or lowered position. Upon adjusting the nut F toward the hub of the hand operating wheel E, the latter is also forced into locking frictional relation with the end of the annular trunnion C, whereby the same hand wheel keyed as it is to the shaft D', serves either to reverse the mold or to raise or lower the swinging arms J of the adjustable frame, as may be required.

Having thus described my invention, what I claim is:—

1. In a molding machine, a supporting frame provided with a suitable bearing, a rotating head having an annular trunnion mounted in the bearing, said head having a projecting platform to receive and support a flask, an adjustable frame provided with guide bars adapted to slide in said head and also provided with projecting arms adapted to bear upon the top of the flask, a shaft sleeved in the trunnion and provided at one end with means for raising or lowering said adjustable frame, and means for rotating said head.

2. In a molding machine, a supporting frame provided with a suitable bearing, a rotating head having an annular trunnion mounted in the bearing, said head also provided with a projecting platform to support a flask, an adjustable frame provided with guide bars adapted to slide in the rotating head, said frame also provided with arms adapted to bear upon the flask, a shaft sleeved in the trunnion provided at one end with means for raising and lowering said frame, a hand wheel keyed to the shaft whereby the same may be rotated, and means for locking said shaft against rotation.

3. In a molding machine, a supporting frame provided with a suitable bearing, a rotating head having an annular trunnion mounted in the bearing, said head having a projecting platform to receive and support a follow-board and flask, an adjustable frame provided with guide bars adapted to slide in said head and also provided with projecting arms adapted to bear upon the top of the flask, a shaft sleeved in the trunnion and provided with a crank arm at one end, a pitman connecting the crank arm and adjustable frame, and means for rotating said head.

4. In a molding machine, a supporting frame provided with a suitable bearing, a rotating head having an annular trunnion mounted in the bearing, said head having a projecting platform to receive and support a follow-board and flask, an adjustable frame provided with guide bars adapted to slide in said head and also provided with projecting arms adapted to bear upon the top of the flask, a shaft sleeved in the trunnion and provided with a crank arm at one end, a pitman connecting the crank arm and adjustable frame, means for securing the rotating head and its projecting platform in its initial and subsequent positions, and means for securing said adjustable frame with its projecting arms in its initial and subsequent positions.

5. In a molding machine, a supporting frame provided with a suitable bearing, a rotating head having an annular trunnion mounted in the bearing, said head also provided with a projecting platform to support a flask, an adjustable frame provided with guide bars adapted to slide in the rotating head, swinging arms pivoted to said frame, a shaft sleeved in the trunnion provided at one end with a crank arm and threaded at the other end to receive a locking nut, a pitman connecting the crank arm with the adjustable frame, a hand wheel keyed to the shaft adjacent to the end of the trunnion, and a locking nut mounted on the end of the shaft adapted to draw said crank arm into frictional locking relation with the rotating head and also force the hub of the hand wheel into frictional locking relation with the end of the trunnion.

6. In a molding machine, a supporting frame provided with a suitable bearing, a chambered rotating head having an annular trunnion mounted in the bearing, a projecting platform secured to said head adapted to support a flask, an adjustable frame provided with guide bars adapted to slide through said chambered head, projecting arms pivoted to the adjustable frame, adjustable nuts supported in said arms adapted to bear upon the covering board of a flask, a shaft sleeved in the trunnion provided with a crank arm at one end, a pitman connecting the crank arm with the adjustable frame, means for securing the rotating head with its projecting platform in its initial and subsequent positions, and means for securing said adjustable frame with its projecting arms in its initial and subsequent position.

7. In a molding machine, a supporting frame provided with a suitable bearing, a chambered rotating head having an annular trunnion mounted in the bearing, said head provided with a projecting platform to support a flask, an adjustable frame having guide bars adapted to slide through openings in the rotating head, swinging arms pivoted to said frame, a shaft sleeved in the trunnion having a crank arm at one end and adapted to swing in the chambered head and threaded at the other end to receive a locking nut, a pitman connecting the crank arm and the adjustable frame, a hand wheel keyed to the shaft adjacent to the end of the trunnion, and a locking nut mounted on the end of the shaft adapted to draw said crank arm into frictional locking relation with the rotating head and also force the hub of the hand wheel into frictional locking relation with the end of the trunnion.

8. In a molding machine, a supporting frame provided with a suitable bearing, a rotating head having an annular trunnion mounted in the bearing, said head provided with a projecting platform to receive and support a flask, an adjustable frame provided with guide bars adapted to slide in said head and also provided with projecting arms designed to bear upon the top of the flask, a shaft sleeved in the trunnion provided with a crank arm at one end, a pitman connecting the crank arm and adjustable frame, a hand wheel keyed to the shaft adapted to rotate said head, a suitable locking mechanism consisting of a spring actuated bolt mounted in the frame adapted to enter suitable apertures provided in the rotating head, and a lever pivoted in the frame adapted to force the bolt from its locked relation with the head against the action of the spring, substantially as described.

In testimony whereof, I sign this specification in the presence of two witnesses.

GEORGE L. GRIMES.

Witnesses:
  SAMUEL E. THOMAS,
  GRACE E. WYNKOOP.